United States Patent
Fang et al.

(10) Patent No.: US 10,582,253 B2
(45) Date of Patent: Mar. 3, 2020

(54) METHOD, DEVICE, AND ELECTRONIC TERMINAL FOR VIDEO RECORDING

(71) Applicant: GUANGZHOU UCWEB COMPUTER TECHNOLOGY CO., LTD, Guangzhou (CN)

(72) Inventors: Keming Fang, Guangzhou (CN); Bairan Zeng, Guangzhou (CN); Guang Yang, Guangzhou (CN); Pan Xu, Guangzhou (CN)

(73) Assignee: GUANGZHOU UCWEB COMPUTER TECHNOLOGY CO., LTD, Guangzhou (CN)

( * ) Notice: Subject to any disclaimer, the term of this patent is extended or adjusted under 35 U.S.C. 154(b) by 5 days.

(21) Appl. No.: 15/843,209

(22) Filed: Dec. 15, 2017

(65) Prior Publication Data
US 2018/0176636 A1    Jun. 21, 2018

(30) Foreign Application Priority Data
Dec. 15, 2016  (CN) .......................... 2016 1 1159384

(51) Int. Cl.
| | | |
|---|---|---|
| *H04N 21/433* | (2011.01) | |
| *H04N 21/81* | (2011.01) | |
| *H04L 29/06* | (2006.01) | |
| *H04N 21/2183* | (2011.01) | |
| *H04N 21/61* | (2011.01) | |

(52) U.S. Cl.
CPC ....... *H04N 21/4334* (2013.01); *H04L 65/607* (2013.01); *H04N 21/2183* (2013.01); *H04N 21/6125* (2013.01); *H04N 21/8173* (2013.01)

(58) Field of Classification Search
CPC .......... H04N 21/6125; H04N 21/4622; H04N 21/4312; H04N 21/4147; H04N 21/47202; H04N 21/47205; H04N 21/47217; H04N 21/431; H04N 21/8173; H04N 21/8586; H04N 21/6175; H04N 21/8166; H04N 21/4782; H04N 5/76; H04N 21/2368; H04N 21/42219; H04N 21/4334; H04N 21/2183; H04L 65/607
See application file for complete search history.

(56) References Cited

U.S. PATENT DOCUMENTS

| | | | | |
|---|---|---|---|---|
| 7,996,450 B1 * | 8/2011 | Lee | ....................... | G06F 16/972 707/899 |
| 8,464,304 B2 * | 6/2013 | Harwell | ............. | H04N 21/2343 725/105 |
| 9,954,919 B1 * | 4/2018 | Khan | ................... | G06F 16/9574 |

(Continued)

*Primary Examiner* — Mulugeta Mengesha
*Assistant Examiner* — Alazar Tilahun
(74) *Attorney, Agent, or Firm* — Anova Law Group, PLLC (57) ABSTRACT

A method, device, and electronic terminal for video recording are provided. The method includes: receiving streaming data of a video, and decoding and broadcasting of the video on a webpage of a browser through a video-playing plugin; based on a triggering operation for starting video recording detected on the webpage by the browser, acquiring first image data and first audio data outputted by the video-playing plugin through a data interaction interface between the video-playing plugin and the browser; encoding the first image data and the first audio data to generate second image data and second audio data; synthesizing the second image data and the second audio data to generate and store streaming data of a recorded video.

16 Claims, 3 Drawing Sheets

(56) References Cited

U.S. PATENT DOCUMENTS

2007/0183741 A1\* 8/2007 Lerman ............. G06F 17/30017
386/249
2013/0044260 A1\* 2/2013 Vestergaard .............. G06F 3/14
348/515
2017/0347158 A1\* 11/2017 Fu .................... H04N 21/23406

\* cited by examiner

METHOD, DEVICE, AND ELECTRONIC TERMINAL FOR VIDEO RECORDING

CROSS-REFERENCES TO RELATED APPLICATIONS

This application claims priority of Chinese Patent Application No. 201611159384.7, filed on Dec. 15, 2016, the entire contents of which are hereby incorporated by reference.

FIELD OF THE DISCLOSURE

The present disclosure relates to the browser-based video image processing technology and, more particularly, relates to a method, a device, and an electronic terminal for video recording.

BACKGROUND

As the internet information technologies develop rapidly, users can watch various types of videos, such as live broadcast, TV shows, and movies, through webpages. When watching such webpage videos through a browser, the users may need to perform video recording of the videos being currently watched.

The inventors discover that there is no method in existing technologies that performs video recording through a browser, and video recording is often realized relying on other screen recording software, which causes the operation to be complicated and the resolution of the recorded video to be low. Further, in existing video recording methods, other operations on the screen during the recording process may affect the recording effects of the video.

BRIEF SUMMARY OF THE DISCLOSURE

To overcome the aforementioned drawbacks in existing technologies, one objective of the present disclosure is to provide a video recording method, the method includes: receiving streaming data of a video, and decoding and broadcasting of the video on a webpage of a browser through a video-playing plugin; based on a triggering operation for starting video recording detected on the webpage by the browser, acquiring first image data and first audio data outputted by the video-playing plugin through a data interaction interface between the video-playing plugin and the browser; encoding the first image data and the first audio data to generate second image data and second audio data; and synthesizing the second image data and the second audio data to generate and store streaming data of a recorded video.

Another objective of the present disclosure provides a video recording device, the device includes: a broadcasting module, configured to receive streaming data of a video and perform decoding and broadcasting of the video on a webpage of a browser through a video-playing plugin; a data-acquiring module configured to, based on a triggering operation for starting video recording detected on the webpage by the browser, acquire first image data and first audio data outputted by the video-playing plugin through a data interaction interface between the video-playing plugin and the browser; an encoding module, configured to, encode the first image data and the first audio data to generate second image data and second audio data; and a synthesizing module, configured to synthesize the second image data and the second audio data to generate and store streaming data of a recorded video.

Another objective of the present disclosure provides an electronic terminal, the electronic terminal includes: a memory; a processor; and a video recording device, where the device is installed in the memory and includes one or more software functional modules executable by the processor. The device includes: a broadcasting module, configured to receive streaming data of a video and perform decoding and broadcasting of the video on a webpage of a browser through a video-playing plugin; a data-acquiring module, configured to, based on a triggering operation for starting video recording detected on the webpage by the browser, acquire first image data and first audio data outputted by the video-playing plugin through a data interaction interface between the video-playing plugin and the browser; an encoding module, configured to, encode the first image data and the first audio data to generate second image data and second audio data; and a synthesizing module, configured to synthesize the second image data and the second audio data to generate and store streaming data of a recorded video.

BRIEF DESCRIPTION OF THE DRAWINGS

To more clearly illustrate technical solutions of the present disclosure, accompanying drawings needed for illustration of embodiments are briefly introduced hereinafter. It should be understood that, the accompanying drawings merely illustrate some embodiments of the present disclosure, and shall not be construed as limiting of the scope of the present disclosure. For those ordinarily skilled in the relevant art, other related accompanying drawings may be obtained based on such accompanying drawings without creative labor.

In the drawings, the reference numerals are: 100—electronic terminal; 110—video recording device; 120—memory; 130—processor; 140—communication unit; 111—broadcasting module; 112—data acquiring module; 1121—detecting sub-module; 1122—button-inserting sub-module; 1123—acquiring sub-module; 1124—detecting sub-module; 1125—instruction-sending sub-module; 113—encoding module; 1131—image encoding sub-module; 1132—audio encoding sub-module; 114—synthesizing module.

DETAILED DESCRIPTION

To make the objective, technical solutions and advantages of the present disclosure clearer, technical solutions of the present disclosure will be described in a clear and full manner with reference to the accompanying drawings in embodiments of the present disclosure. Apparently, the embodiments described herein are a part of embodiments of the present disclosure, but not all embodiments. Components in embodiments of the present disclosure described and illustrated in corresponding drawings can often be configured and designed using different configurations.

Thus, the detailed descriptions of embodiments of the present disclosure provided in the accompanying drawings are not intended to limit the scope of the present disclosure, but merely represent embodiments illustrated in the present disclosure. Based on embodiments of the present disclosure, all other embodiments obtainable by those ordinarily skilled in the relevant art without creative labor shall fall within the protection scope of the present disclosure.

It should be noted that: like reference numerals and letters in the accompanying drawings represent like components. Thus, once an item is defined in one drawing, no further definition and explanation are needed in the succeeding accompanying drawings.

In descriptions of the present disclosure, it should be noted that, terms "first", "second", and "third" are merely used for differentiation and description, and shall not be understood as indicating or implying their relative importance.

In descriptions of the present disclosure, it should be further noted that, unless being clearly specified and defined, terms "configure", "install", "couple", "connect" shall be understood to have generalized meaning, such as fixed connection, detachable connection, or integral connection; or mechanical connection, electrical connection; or direct connection, indirect connection via an intermediate medium; or internal connection between two components. For those ordinarily skilled in the relevant art, specific meaning of the aforementioned terms can be understood based on specific conditions.

Figure 1:
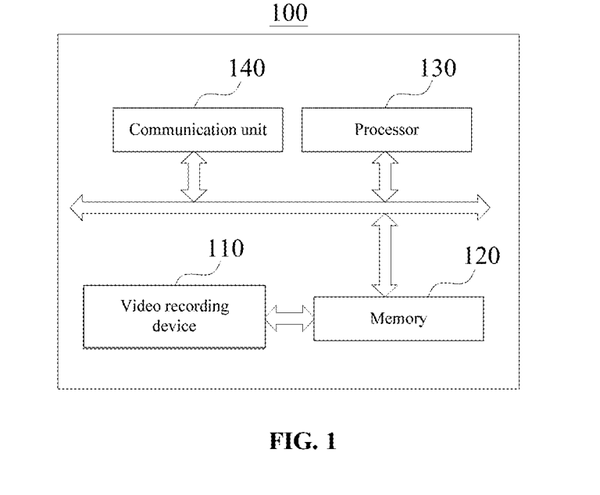
FIG. 1 illustrates a schematic view of an electronic terminal consistent with the disclosed embodiments of the present disclosure.

FIG. 1 illustrates an electronic terminal 100 provided by embodiments of the present disclosure. The electronic terminal 100 may be, not limited to, a personal computer (PC), a tablet, a smart phone, a personal digital assistant (PDA), or a mobile internet device (MID), etc. The electronic terminal 100 may include a video recording device 110, a memory 120, a processor 130, and a communication unit 140.

Components of the memory 120, the processor 130, and the communication unit 140 may be connection directly or indirectly via an electric connection to implement data transmission or interaction. For example, electric connection between such components may be implemented through one or more communication buses or signal lines. The video recording device 110 includes at least one software function module stored in the memory 120 or coupled to an operating system (OS) of the electronic terminal 100 in the form of software or firmware. The processor 130 is configured to execute executable modules stored in the memory 120, such as the software functional module(s) and computer program(s) included in the video recording device 110.

The memory 120 may be, but not limited to, a random access memory (RAM) 120, a read-only memory (ROM) 120, a programmable read-only memory (PROM) 120, an erasable programmable read-only memory (EPROM), or an electric erasable programmable read-only memory (EEPROM) 120, etc. The memory 120 is configured to store programs, and the processor 130 executes the programs after receiving an execution instruction.

The processor 130 may be a type of integrated circuit chip having a signal processing capability. The aforementioned processor 130 may be a general-purpose processor 130, such as a central processing unit (CPU) 130, or a network processor (NP) 130, etc., or may be a digital signal processor (DSP) 130, an application-specific integrated circuit (ASIC), a field-programmable gate array (FPGA), or other programmable logic device, discrete gate or transistor logic device, or discrete hardware component. Each method, step and logic block diagrams disclosed in embodiments of the present disclosure may thus be implemented or executed. The general-purpose processor 130 may be a micro-processor 130, or the general-purpose processor 130 may be any regular processor 130, etc.

The communication unit 140 may be configured to acquire data information, such as the video data disclosed herein.

Figure 2:
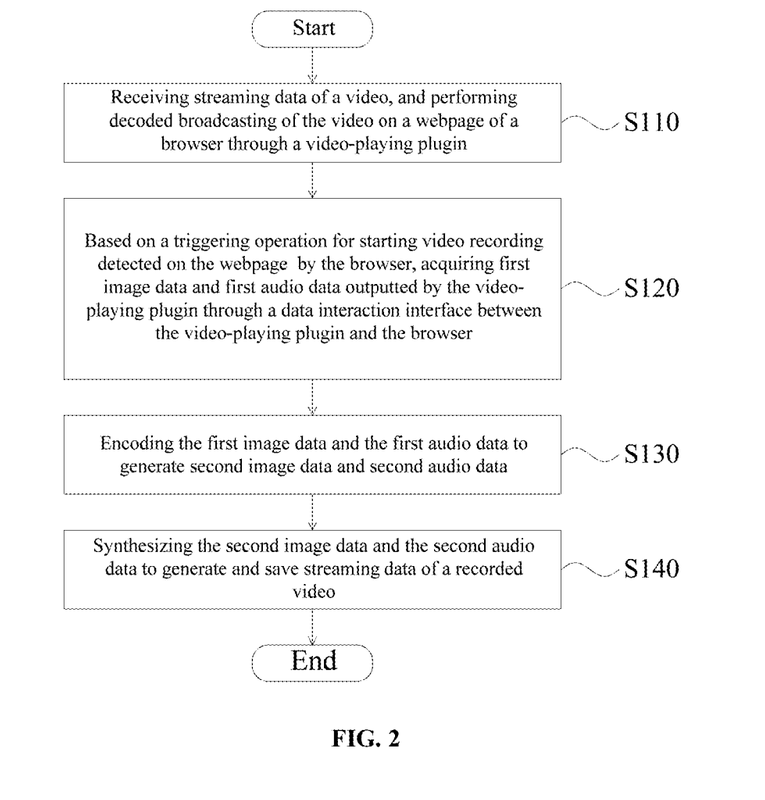
FIG. 2 illustrates a flow chart of a video recording method consistent with the disclosed embodiments of the present disclosure.

FIG. 2 illustrates a video recording method applicable to the electronic terminal 100 in FIG. 1. The method includes the following steps.

At Step S110, streaming data of a video is received, and decoding and broadcasting of the video is performed on a webpage of a browser through a video-playing plugin.

The videos on current video websites in China are mostly Flash video. Thus, in one embodiment, the video-playing plugin may be a Flash plugin. The electronic terminal 100 receives the streaming data of the video from the video website through the browser, and invokes the Flash plugin through the browser to decode the video. The electronic terminal 100 sends the decoded data to a display unit of the electronic terminal 100, thus enabling the video to be played on the webpage of the browser.

At Step S120, based on a triggering operation for starting video recording detected on the webpage by the browser, first image data and first audio data outputted by the video-playing plugin are acquired through a data interaction interface between the video-playing plugin and the browser.

Because the Flash plugin is closed-source product, the Flash plugin cannot obtain original video data and the original audio data from the video stream. The video images may be captured at the level of source code of the Flash plugin through the data interaction interface between the Flash plugin and the browser. Accordingly, in one embodiment, the electronic terminal 100 may capture the first image data and the first audio data through the data interaction interface between the Flash plugin and the browser.

Figure 3:
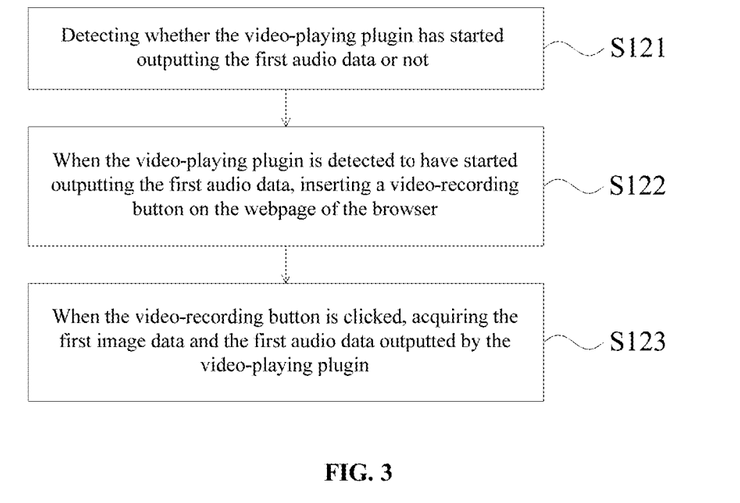
FIG. 3 illustrates a flow chart of sub-steps of step S120 illustrated in FIG. 2.

FIG. 3 illustrates a flow chart of sub-steps of step S120 illustrated in FIG. 2. Specifically, referring to FIG. 3, in one embodiment, the triggering operation that start the video recording may be a clicking operation of the user on the video-recording button. Step S120 may receive the triggering operation that starts the video recording and acquire the first image data and the first audio data via the following sub-steps.

At sub-Step S121, whether the video-playing plugin has started outputting the first audio data or not is detected.

Because other than being configured to perform video playing, the Flash plugin on the webpage may also be configured to broadcast other dynamic images such as silent advertisement. By determining whether the video-playing plugin has started outputting the audio data or not, whether the effective video on the webpage has started playing may be relatively accurately recognized. Thus, in the present disclosure, the electronic terminal 100 detects whether the audio output interface of the video-playing plugin has started outputting the first audio data, thereby determining whether the video on the webpage has started playing.

At sub-Step S122, when the video-playing plugin is detected to have started outputting the first audio data, a video-recording button is inserted on the webpage of the browser.

Figure 4:
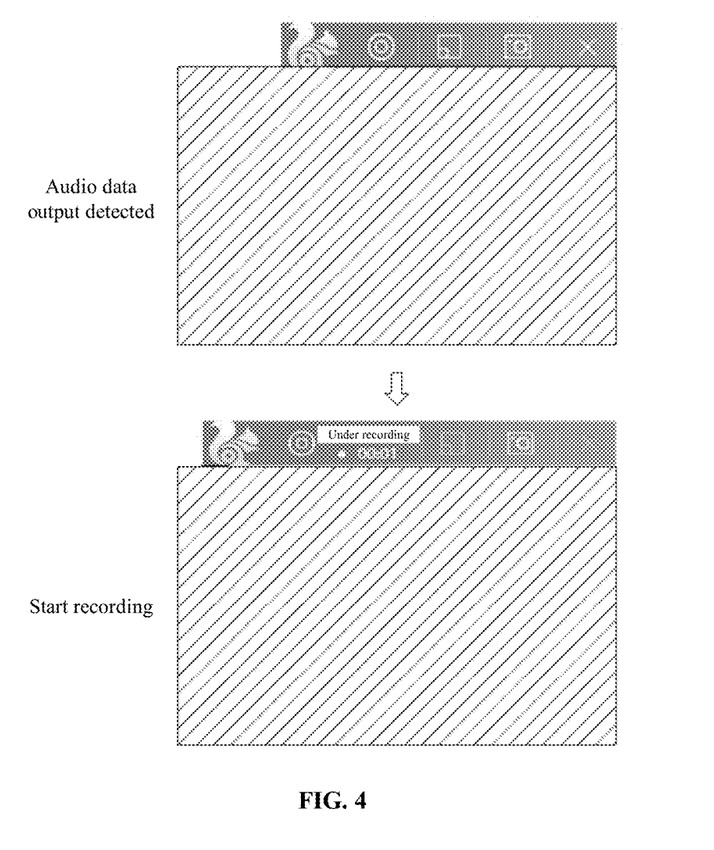
FIG. 4 illustrates a schematic view of a video-playing interface consistent with the disclosed embodiments of the present disclosure.

FIG. 4 illustrates a schematic view of a video-playing interface consistent with the disclosed embodiments of the present disclosure. Referring to FIG. 4, in one example, the upper portion of FIG. 4 illustrates a scenario in which the video-playing plugin is detected to have started output of the audio data, and the lower portion of FIG. 4 illustrates a scenario in which video recording is started. More specifically, when the electronic terminal 100 detects that the video-playing plugin has started outputting the audio data, the video-recording button is inserted near the image displaying region of the webpage of the browser that broadcast the video.

The video-recording button may be disposed within a task bar that displays a plurality of functional buttons or icons, and the task bar may be configured above the image displaying region. For example, the video-recording button may be disposed between an icon representing the video-playing plugin (e.g., a graphic squirrel) and a button for storing a file played by the video-playing plugin. Once the video-recording button is clicked, the appearance of the video-recording button may be changed slightly to indicate that the video-recording button is clicked.

For example, before being clicked, the video-recording button may have an appearance characterized by two concentric circles, and after being clicked, the inner circle of the video-recording button may change to a square while the outer circle remains unchanged. Optionally, when the video-recording button is clicked, the size of the task bar may be increased to allow the display of more recording information near the video-recording button. The additional recording information may include a short text indicating a video is being recorded (e.g., "Under recording"), or a digital clock showing the recording time of the video. After the video recording comes to an end, the video-recording button may back to show two concentric circles, indicating no video recording is currently being performed.

At sub-Step S123, when the video-recording button is clicked, the first image data and the first audio data outputted by the video-playing plugin are acquired.

In one embodiment, the electronic terminal 100 acquires the first image data and the first audio data from the data interaction interface between the video-playing plugin and the browser. When the first image data is acquired, based on an initial dimension of the image displaying region of the video-playing plugin, a corresponding canvas cache region is configured, and the displaying format of the canvas cache region in the memory may be the RGBA format. The electronic terminal 100 uniformly converts the captured first image data into the RGBA format, and fills the first image data to a designated region of the canvas cache region based on pre-configured location information.

Further, when the video-displaying plugin detects that the image displaying region where the video is broadcast is invisible, for example, the browser is minimized, or the webpage for video playing is in a non-display label, or the image displaying region of the video is rolled to invisible position of the webpage, the output of the image data may be terminated to reduce unnecessary performance loss.

Accordingly, in the present disclosure, when the electronic terminal 100 stops outputting the first image data after detecting that the image displaying region is invisible, the electronic terminal 100 may send the instruction for continuing to output the first image data to the video-displaying plugin that plays the video, such that the first image data is ensured to be fully captured.

Specifically, when the browser is minimized or the video-playing webpage is in the non-display label, the browser may terminate the callback of the image data towards the data interaction interface of the video-playing plugin. Without receiving the data callback, the video-playing plugin may not further output an image. Thus, in the present disclosure, a timing task may be designed to trigger the browser to send data call-back to the video-playing plugin, such that the video-playing plugin can continuously output the first image data.

The browser may allocate a display region for the video-playing plugin, and when the image displaying region of the video-playing plugin is rolled to the invisible region by dragging of the rolling bar, the video-playing plugin does not further output image data. Accordingly, in the present disclosure, the electronic terminal 100 may be designed to, when the video-playing plugin is rolled to the invisible region, forge a visible region for the video-playing plugin, such that the video-playing plugin continues to output the first image data.

Based on the aforementioned design, the video recording method provided by the present disclosure may, by acquiring the first image data outputted by the video-playing plugin, ensure that the obtained recorded images are images from the image displaying region of the video. With respect to the existing technologies in which video recording is performed through screen recording, the method provided by the present disclosure ensures that during recording, the recorded images are free of disturbance (e.g., presence of the mouse cursor or other pop-up windows, etc.) from other operations on the screen, and the resolution of the recorded video is substantially consistent with the resolution of the original video that plays in the window of the webpage.

Further, the electronic terminal 100 records the length of the video recording and displays the length of the video recording on the webpage of the browser.

Referring once again to FIG. 4, in one embodiment, after the video-recording button is clicked, the electronic terminal 100 may switch the video-recording button to a timer that displays the length of the video recording, thereby conveniently notifying the user about the length of the video recording.

At Step S130, the first image data and the first audio data are encoded to generate the second image data and the second audio data.

Specifically, because the encoding logic is a part of the video recording process that consumes considerable amount of time, in one embodiment, the electronic terminal 100 may allocate the first cache region to temporarily store the first image data and allocate the second cache region to temporarily store the first audio data, thereby ensuring that the first image data and the first audio data are orderly encoded during the encoding process.

In one embodiment, the electronic terminal 100 encodes the first image data in the first cache region to generate the second image data, and the second image data may be, but not limited to, in a VP8 or H264 format. The electronic terminal 100 may encode the first audio data in the second cache region to generate the second audio data, and the format of the second audio data may be, but not limited to, an AAC or Vorbis format.

Further, if the acquisition rate of the first image data is far greater than the encoding rate, the encoding process may be affected. Thus, in one embodiment, the electronic terminal

100 may perform a frame-dropping process on the received image frames when the number of the image frames is greater than a preset threshold.

Specifically, in one embodiment, the preset threshold may be set to be 300 frames. When the number of image frames in the first cache region is greater than 300, the electronic terminal 100 may discard a part of the received image frames without storing them in the first cache region. The frame-dropping strategy of the electronic terminal 100 may be configured to discard one image frame every other image frame.

At Step S140, the second image data and the second audio data are synthesized into streaming data of the recorded video and the streaming data of the recorded video is stored.

Specifically, in one embodiment, the second audio data in the VP8 format and the second image data in the Vorbis format may be synthesized into streaming data of the recorded video in a WebM format. The second audio data in the H264 format may be synthesized with the second video data in the AAC format into the streaming data of the recorded video in the FLV or MP4 format, where the FLV format may be more frequently used.

Because the encoding process is not authorized to store a document, the electronic terminal 100 may send the synthesized streaming data of the recorded video to a main process running on the browser for storage. Specifically, the streaming data of the recorded video in the FLV format is stored in a certain order, and for the streaming data of the recorded video in the WebM format, designated data may be written at designated document location for localization and storage.

Further, in one embodiment, a video-storing configuration button is displayed on a window of the browser, and when the video-storing configuration button is clicked, a storing-path configuration window may be displayed. Based on a configuration operation of the user on the storing-path configuration window, the path to store the streaming data of the recorded video is configured to be a user-configured path.

Figure 5:
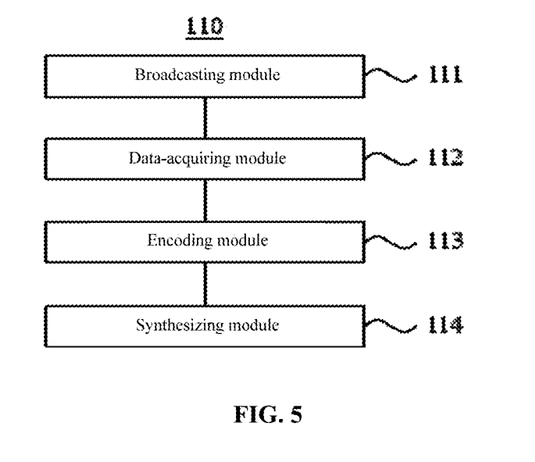
FIG. 5 illustrates a schematic view of a video recording device consistent with the disclosed embodiments of the present disclosure.

Referring to FIG. 5, the present disclosure further provides a video recording device 110. The device includes a broadcasting module 111, a data acquiring module 112, an encoding module 113, and a synthesizing module 114. The broadcasting module 111 is configured to receive streaming data of a video and perform decoding and broadcasting of the video on a webpage of a browser through a video-playing plugin. In one embodiment, the broadcasting module 111 may be configured to execute Step S110 illustrated in FIG. 2, and specific descriptions of the broadcasting module 111 may refer to descriptions of Step S110.

The data-acquiring module 112 is configured to, based on a triggering operation for starting video recording detected on the webpage by the browser, acquire first image data and first audio data outputted by the video-playing plugin through a data interaction interface between the video-playing plugin and the browser. In one embodiment, the data-acquiring module 112 may be configured to execute Step S120 illustrated in FIG. 2, and detailed descriptions of the data-acquiring module 112 may refer to descriptions of Step S120.

Figure 6:
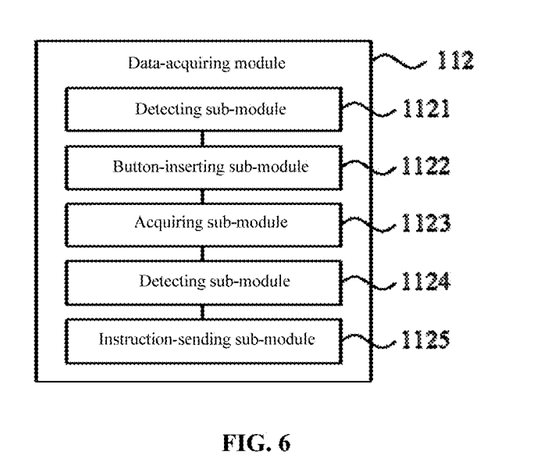
FIG. 6 illustrates a schematic view of a sub-module of a data-acquiring module illustrated in FIG. 5.

Specifically, the triggering operation for starting video recording may be a click operation of the user on the video-recording button. FIG. 6 illustrates a schematic view of a sub-module of a data-acquiring module illustrated in FIG. 5. The data-acquiring module 112 may include a detecting sub-module 1121, a button-inserting sub-module 1122, and an acquiring sub-module 1123.

The detecting sub-module 1121 is configured to detect whether the video-playing plugin has started outputting the first audio data or not. In one embodiment, the detecting sub-module 1121 may be configured to execute sub-Step S121 illustrated in FIG. 3, and detailed descriptions of the detecting sub-module 1121 may refer to descriptions of Step S121.

The button-inserting sub-module 1122 is configured to insert a video-recording button on the webpage of the browser when the video-playing plugin is detected to have started outputting the first audio data. In one embodiment, the button-inserting sub-module 1122 may be configured to execute the sub-Step S122 illustrated in FIG. 3, and detailed descriptions of the button-inserting sub-module 1122 may refer to Step S122.

The acquiring sub-module 1123 is configured to acquire the first image data and the first audio data outputted by the video-playing plugin when the video-recording button is clicked. In one embodiment, the acquiring sub-module 1123 may be configured to execute the sub-Step S123 illustrated in FIG. 3, and detailed descriptions of the acquiring sub-module 1123 may refer to Step S123.

Further, referring to FIG. 6 again, the data-acquiring module 112 may further include a detecting sub-module 1124 and an instruction-sending sub-module 1125.

The detecting sub-module 1124 is configured to detect whether the video-playing plugin of the video stops outputting the first image data because of invisibility of an image-displaying region.

The instruction-sending sub-module 1125 is configured to send an instruction that continues to output the first image data to the video-playing plugin when the video-playing plugin is detected to have stopped outputting the first image data.

The encoding module 113 is configured to encode the first image data and the first audio data to generate second image data and second audio data. In one embodiment, the encoding module 113 may be configured to execute Step S130 illustrated in FIG. 2, and detailed descriptions of the encoding module 113 may refer to descriptions of Step S130.

Figure 7:
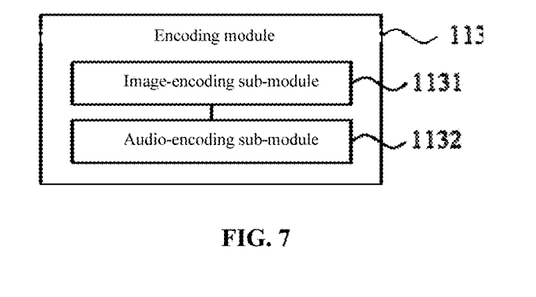
FIG. 7 illustrates a schematic view of a sub-module of an encoding module illustrated in FIG. 5.

FIG. 7 illustrates a schematic view of a sub-module of an encoding module illustrated in FIG. 5. Referring to FIG. 7, the encoding module 113 may include an image-encoding sub-module 1131 and an audio-encoding sub-module 1132.

The image-encoding sub-module 1131 may be configured to cache the first image data to a first cache region, and encode the first image data of the first cache region to generate the second image data.

Specifically, the image-encoding sub-module 1131 may be further configured to:
when the number of the image frames is greater than a preset threshold, perform a frame-dropping process on the received image frames.

The audio-encoding sub-module 1132 is configured to cache the first audio data to a second cache region, and encode the first audio data of the second cache region to generate the second audio data.

The synthesizing module 114 may be configured to synthesize the second image data and the second audio data into streaming data of the recorded video and further store the streaming data of the recorded video.

Further, the device may include a length-recording recording module.

The length-recording recording module is configured to record a length of the video recording and display the length of the video recording on the webpage of the browser.

Further, the device may further include a storing-path selecting module.

The storing-path selecting module is configured to display a video-storing configuration button on a window of the browser, and when the video-storing configuration button is clicked, display a storing-path configuration window. Further, based on a configuration operation of a user on the storing-path configuration window, the storing-path selecting module configures the path to store the streaming data of the recorded video as a user-configured path.

As such, the present disclosure provides a method, a device, and an electronic terminal for recording video. By using the disclosed method, device, and electronic terminal for video recording, the first image data and first audio data decoded and outputted by the video-playing plugin on the webpage may be acquired through the browser for video recording, thereby avoiding the impacts of other operations on the recorded images during the video recording process. Further, the recording effects are satisfying, and the resolution of acquired video is consistent with the resolution of the original video source.

In embodiments of the present disclosure, it should be understood that the disclosed device and method may also be implemented through other approaches. The aforementioned device embodiments are for illustrative purposes, for example, the flow charts and block diagrams in the accompanying drawings display the system framework, function and operation possibly implemented by device, method, and computer program products illustrated in various embodiments of the present disclosure. In this regards, each block in the flow charts or block diagrams may represent a part of one module, program section or code, and a part of the module, program section or code includes one or more executable instructions for implementing the defined logic functions. It should also be noted that, in certain alternative implementation methods, the functions denoted in the blocks may also occur in orders different from that denoted in the accompanying drawing. For example, two consecutive blocks may be in fact executed in parallel, or they may sometimes be executed in a reversed order, which is defined by involved functions. It should also be noted that, each block in the block diagrams and/or flow charts, and combinations of blocks in the block diagram and/or flow chart may be implemented based on hardware system that executes defined functions or actions, or implemented by a combination of specialized hardware and the computer instructions.

Further, each functional module in various embodiments of the present disclosure may be integrated to form an individual part, or each module may exist individually, or two or more modules may form an individual part.

The disclosed functions may be stored in a computer readable storage medium if implemented in the form of software function modules and sold or used as individual products. Based on such understanding, technical solutions of the present disclosure or a part that contributes to the existing technologies or a part of the technical solutions may be embodied in the form of software products, and the computer software products may be stored in the storage medium, including a plurality of instructions for enabling the computer device (e.g., personal computer, server, or network device) to execute all or a part of steps of methods in each embodiment of the present disclosure. The aforementioned storage media include various media for storing program codes, such as flash drive, portable hardware, read-only memory (ROM), random access memory (RAM), magnetic disc or optical disk.

It should be noted that, in this paper, relationship terms such as first and second are merely used to differentiate one entity or operation from another entity or operation, without requiring or indicating the existence of any actual relationships or orders between such entities or operations. Further, the terms "including", "comprising" or any other variations are intended to cover non-exclusive including, thereby enabling the process, method, article, or device including a series of factors to include not only such factors, but further include other factors not clearly listed herein, or factors intrinsic to the process, method, article or device. Without more limitations, the factor defined by the sentence "including one . . . " does not exclude the existence of additional factors in the process, method, article or device that include the aforementioned factors.

The abovementioned embodiments are only preferred embodiments of the present disclosure, and are not intended to limit the present disclosure. For those skilled in the relevant art, the present disclosure may have various kinds of modifications and changes. Without departing from the spirit and principle of the present disclosure, any modification, equivalent replacements or improvements, etc. shall be included in the protection scope of the present disclosure. It should be noted that: like reference numerals and letters in the accompanying drawings represent similar items. Thus, once an item is defined in a drawing, n further definition and explanation are needed in the succeeding accompanying drawings.

As such, foregoing is merely specific implementation methods of the present disclosure, and the protection scope of the present disclosure is not limited thereto. Within the technical scope disclosed in the present disclosure, any skilled in the relevant art shall obtain other changes or replacements without much effort. Thus, the protection scope of the present disclosure shall be defined by the protection scope of the claims.

What is claimed is:

1. A method for video recording performed by computer programs stored in a memory and executable by a processor, the method comprising:

while receiving streaming data of a video, decoding and broadcasting of the video on a webpage of a browser through a video-playing plugin;

based on a triggering operation for starting video recording detected on the webpage by the browser, acquiring, at an acquisition rate, first image data and first audio data outputted by the video-playing plugin through a data interaction interface between the video-playing plugin and the browser;

while keeping receiving the streaming data of the video, detecting an output of the video-playing plugin, wherein when the video-playing plugin is detected to have stopped outputting the first image data, sending an instruction to the video-playing plugin for continuing to output the first image data;

encoding, at an encoding rate, the first image data and the first audio data to generate second image data and second audio data;

when the acquisition rate of the first image data is greater than the encoding rate of the first image data into the second image data, and/or when a quantity of image frames of the first image data from the received streaming data of the video is greater than a preset threshold, performing a frame-dropping process on the image frames of the first image data; and while keeping receiving the streaming data of the video, synthesizing the second image data and the second audio data into streaming data of a recorded video, and storing the streaming data of the recorded video.

2. The method according to claim 1, wherein based on the triggering operation for starting video recording detected on the webpage by the browser, acquiring the first image data and the first audio data outputted by the video-playing plugin through the data interaction interface between the video-playing plugin and the browser further includes:
  detecting whether the video-playing plugin has started outputting the first audio data or not;
  when the video-playing plugin is detected to have started outputting the first audio data, inserting a video-recording button on the webpage of the browser; and
  when the video-recording button is clicked, acquiring the first image data and the first audio data outputted by the video-playing plugin.

3. The method according to claim 1, wherein encoding, at the encoding rate, the first image data and the first audio data to generate the second image data and the second audio data further includes:
  caching the first image data to a first cache region, and encoding the first image data of the first cache region to generate the second image data; and
  caching the first audio data to a second cache region, and encoding the first audio data of the second cache region to generate the second audio data.

4. The method according to claim 3, wherein the frame-dropping process includes:
  discarding a part of the first image data without storing them in the first cache region.

5. The method according to claim 1, further including:
  recording a length of video recording, and
  displaying the length of video recording on the webpage of the browser.

6. The method according to claim 1, further including:
  displaying a video-storing configuration button on a window of the browser, and when the video-storing configuration button is clicked, displaying a storing-path configuration window; and
  based on a configuration operation of a user on the storing-path configuration window, configuring a path to store the streaming data of the recorded video as a user-configured path.

7. A device for video recording, comprising:
  a memory storing executable computer programs; and
  a processor coupled to the memory, being configured to:
    while receiving streaming data of a video, perform decoding and broadcasting of the video on a webpage of a browser through a video-playing plugin;
    based on a triggering operation for starting video recording detected on the webpage by the browser, acquire, at an acquisition rate, first image data and first audio data outputted by the video-playing plugin through a data interaction interface between the video-playing plugin and the browser;
    while keeping receiving the streaming data of the video, detect an output of the video-playing plugin, wherein when the video-playing plugin is detected to have stopped outputting the first image data, sending an instruction to the video-playing plugin for continuing to output the first image data;
    encode, at an encoding rate, the first image data and the first audio data to generate second image data and second audio data;
    when the acquisition rate of the first image data is greater than the encoding rate of the first image data into the second image data, and/or when a quantity of image frames of the first image data from the received streaming data of the video is greater than a preset threshold, perform a frame-dropping process on the image frames of the first image data; and
    while keeping receiving the streaming data of the video, synthesize the second image data and the second audio data into streaming data of a recorded video, and store the streaming data of the recorded video.

8. The device according to claim 7, the processor is further configured to:
  detect whether the video-playing plugin has started outputting the first audio data or not;
  insert a video-recording button on the webpage of the browser when the video-playing plugin is detected to have started outputting the first audio data; and
  acquire the first image data and the first audio data outputted by the video-playing plugin when the video-recording button is clicked.

9. The device according to claim 7, wherein the processor is further configured to:
  cache the first image data to a first cache region, and encode the first image data of the first cache region to generate the second image data; and
  cache the first audio data to a second cache region, and encode the first audio data of the second cache region to generate the second audio data.

10. The device according to claim 7, wherein the processor is further configured to:
  record a length of video recording and display the length of video recording on the webpage of the browser.

11. The device according to claim 7, wherein the processor is further configured to:
  display a video-storing configuration button on a window of the browser, display a storing-path configuration window based on a configuration operation of a user on the storing-path configuration window when the video-storing configuration button is clicked, and configure a path to store the streaming data of the recorded video as a user-configured path.

12. An electronic terminal, comprising:
  a memory;
  a processor; and
  a video recording device, wherein the device is installed in the memory and includes one or more software functional modules executable by the processor, the processor being configured to:
    while receiving streaming data of a video, perform decoding and broadcasting of the video on a webpage of a browser through a video-playing plugin;
    based on a triggering operation for starting video recording detected on the webpage by the browser, acquire, at an acquisition rate, first image data and first audio data outputted by the video-playing plugin through a data interaction interface between the video-playing plugin and the browser;
    while keeping receiving the streaming data of the video, detect an output of the video-playing plugin, wherein when the video-playing plugin is detected to have stopped outputting the first image data, sending an instruction to the video-playing plugin for continuing to output the first image data;
    encode, at an encoding rate, the first image data and the first audio data to generate second image data and second audio data;
    when the acquisition rate of the first image data is greater than the encoding rate of the first image data into the second image data, and or when a quantity of image frames of the first image data from the received streaming data of the video is greater than a preset threshold, perform a frame-dropping process on the image frames of the first image data; and while keeping receiving the streaming data of the video, synthesize the second image data and the second audio data into streaming data of a recorded video, and store the streaming data of the recorded video.

13. The electronic terminal according to claim 12, wherein the processor is further configured to:

detect whether the video-playing plugin has started outputting the first audio data or not;

insert a video-recording button on the webpage of the browser when the video-playing plugin is detected to have started outputting the first audio data; and acquire the first image data and the first audio data outputted by the video-playing plugin when the video-recording button is clicked.

14. The electronic terminal according to claim 12, wherein the processor is further configured to:

cache the first image data to a first cache region, and encode the first image data of the first cache region to generate the second image data; and cache the first audio data to a second cache region, and encode the first audio data of the second cache region to generate the second audio data.

15. The electronic terminal according to claim 12, wherein the processor is further configured to:

record a length of video recording and display the length of video recording on the webpage of the browser.

16. The electronic terminal according to claim 12, wherein the processor is further configured to:

display a video-storing configuration button on a window of the browser, display a storing-path configuration window based on a configuration operation of a user on the storing-path configuration window when the video-storing configuration button is clicked, and configure a path to store the streaming data of the recorded video as a user-configured path.

* * * * *